(12) United States Patent
Bisht

(10) Patent No.: US 9,495,102 B2
(45) Date of Patent: Nov. 15, 2016

(54) INPUT/OUTPUT (I/O) INTERCEPTOR THAT RE-ORDERS A PLURALITY OF WRITE I/O INTO COMBINED WITH I/O WITH INTELLIGENT FLUSH CONTROL LOGIC

(71) Applicant: Pradeep Bisht, Mountain View, CA (US)

(72) Inventor: Pradeep Bisht, Mountain View, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 189 days.

(21) Appl. No.: 14/536,567

(22) Filed: Nov. 7, 2014

(65) Prior Publication Data
US 2016/0034188 A1    Feb. 4, 2016

Related U.S. Application Data

(60) Provisional application No. 62/031,842, filed on Jul. 31, 2014.

(51) Int. Cl.
*G06F 3/00* (2006.01)
*G06F 3/06* (2006.01)

(52) U.S. Cl.
CPC ............. *G06F 3/061* (2013.01); *G06F 3/0655* (2013.01); *G06F 3/0688* (2013.01)

(58) Field of Classification Search
CPC ..... G06F 3/061; G06F 3/0688; G06F 3/0655
See application file for complete search history.

(56) References Cited

U.S. PATENT DOCUMENTS

| 8,161,241 | B2 | 4/2012 | Bhattacharjee et al. |
| 9,311,240 | B2 * | 4/2016 | Dawkins ............. G06F 12/0813 |
| 2010/0180065 | A1 | 7/2010 | Cherian et al. |
| 2010/0215020 | A1 * | 8/2010 | Lee ........................ H04L 1/1614 370/331 |
| 2014/0047181 | A1 | 2/2014 | Peterson et al. |
| 2014/0059292 | A1 | 2/2014 | Phelan et al. |
| 2015/0237180 | A1 * | 8/2015 | Swartzentruber ..... H04L 69/324 370/394 |

* cited by examiner

*Primary Examiner* — Tammara Peyton
(74) *Attorney, Agent, or Firm* — Renaissance IP Law Group LLP

(57) ABSTRACT

Inventive aspects include an input/output (I/O) interceptor logic section having an I/O interface coupled with a storage stack. The I/O interface can intercept write I/Os, read I/Os, and flush requests from an application. A temporary write holding buffer can store the write I/Os. A re-order logic section can change an order of the write I/Os, and combine the re-ordered write I/Os into a combined write I/O. An intelligent flush control logic section can receive the flush requests from the I/O interface, communicate write I/O completion of the write I/Os to the application without the write I/Os having been written to a non-volatile storage device, and cause the combined write I/O to be written to the non-volatile storage device responsive to at least one of a predefined Nth flush request from among the plurality flush requests, a threshold amount of data being accumulated, or an expiration of a predefined time period.

20 Claims, 12 Drawing Sheets

INPUT/OUTPUT (I/O) INTERCEPTOR THAT RE-ORDERS A PLURALITY OF WRITE I/O INTO COMBINED WITH I/O WITH INTELLIGENT FLUSH CONTROL LOGIC

BACKGROUND

The present inventive concepts relate to computerized storage techniques, and more particularly, to an input/output (I/O) interceptor with intelligent flush control logic embedded within a storage stack of a computerized device such as a mobile phone or tablet.

Performance demands on mobile devices such as mobile telephones and tablets are increasing. What was traditionally accomplished on a multitude of separate devices such as cameras, calculators, personal computers, servers, global positioning system (GPS) devices, and the like, are now being consolidated and handled by mobile devices. While the processor performance and the wireless data speeds of such mobile devices have steadily improved, the local storage stack within such mobile devices has not advanced as quickly. Flush requests that are commonly used to ensure data consistency have become barriers to performance because I/Os are blocked during the flush command. Consequently, the storage stack and associated local storage devices of such mobile devices have become a performance bottleneck. Embodiments of the inventive concept address these and other limitations in the prior art.

BRIEF SUMMARY

Embodiments of the inventive concept may include an input/output (I/O) interceptor logic section. The I/O interceptor logic section can include an I/O interface communicatively coupled with a storage stack and configured to intercept a plurality of write I/Os and a plurality of flush requests from an application. One or more temporary write holding buffers can be configured to receive the plurality of write I/Os from the I/O interface and to store the plurality of write I/Os. A re-order logic section can be communicatively coupled to the one or more temporary write holding buffers, and configured to change an order of the plurality of write I/Os stored in the one or more temporary write holding buffers. In addition, the re-order logic section can combine the re-ordered plurality of write I/Os into a combined write I/O. An intelligent flush control logic section can be configured to receive the plurality of flush requests from the I/O interface. The intelligent flush control logic section can communicate write I/O completion of the plurality of write I/Os to the application without the plurality of write I/Os having been written to a non-volatile storage device. In addition, the intelligent flush control logic section can cause the combined write I/O to be written to the non-volatile storage device responsive to at least one of a predefined Nth flush request from among the plurality flush requests, a threshold amount of data being accumulated, or an expiration of a predefined time period.

Embodiments of the inventive concept may include an input/output (I/O) interceptor logic section. The I/O interceptor logic section can include an I/O interface communicatively coupled with a storage stack and configured to intercept a plurality of write I/Os and a plurality of flush requests from an application. A plurality of temporary write holding buffers can be configured to receive the plurality of write I/Os from the I/O interface and to store the plurality of write I/Os. A multiple-buffer holding queue can be configured to hold the plurality of temporary write holding buffers. An intelligent flush control logic section can be configured to receive the plurality of flush requests from the I/O interface. The intelligent flush control logic section can be configured to communicate write I/O completion of the plurality of write I/Os to the application without the plurality of write I/Os having been written to a non-volatile storage device. The intelligent flush control logic section can be configured to cause the multiple-buffer holding queue to empty the plurality of write I/Os from the plurality of temporary write holding buffers to the non-volatile storage device responsive to at least one of a predefined Nth flush request from among the plurality flush requests, a threshold amount of data being accumulated, or an expiration of a predefined time period.

Embodiments of the inventive concept may include a computer-implemented method for intercepting input/outputs (I/Os) from an application using an I/O interceptor logic section. The method may include intercepting, by an I/O interface of the I/O interceptor logic section, a plurality of write I/Os and a plurality of flush requests from the application. The method may include storing, by one or more temporary write holding buffers, the plurality of write I/Os intercepted by the I/O interface. The method may include changing an order, by a re-order logic section, of the plurality of write I/Os stored in the one or more temporary write holding buffers. The method may include combining, by the re-order logic section, the re-ordered plurality of write I/Os into a combined write I/O. The method may include receiving, by an intelligent flush control logic section, the plurality of flush requests from the I/O interface. The method may include communicating, by the intelligent flush control logic section, write I/O completion of the plurality of write I/Os to the application without the plurality of write I/Os having been written to a non-volatile storage device. The method may include causing, by the intelligent flush control logic section, the combined write I/O to be written to the non-volatile storage device responsive to at least one of a predefined Nth flush request from among the plurality flush requests, a threshold amount of data being accumulated, or an expiration of a predefined time period.

Embodiments of the inventive concept may include a computer-implemented method for intercepting input/outputs (I/Os) from an application using an I/O interceptor logic section. The method may include intercepting, by an I/O interface, a plurality of write I/Os and a plurality of flush requests from an application. The method may include storing, by a plurality of temporary write holding buffers, the plurality of write I/Os intercepted by the I/O interface. The method may include holding, by a multiple-buffer holding queue, the plurality of temporary write holding buffers. The method may include receiving, by an intelligent flush control logic section, the plurality of flush requests from the I/O interface. The method may include communicating, by the intelligent flush control logic section, write I/O completion of the plurality of write I/Os to the application without the plurality of write I/Os having been written to a non-volatile storage device. The method may include causing, by the intelligent flush control logic section, the multiple-buffer holding queue to empty the plurality of write I/Os from the plurality of temporary write holding buffers to the non-volatile storage device responsive to at least one of a predefined Nth flush request from among the plurality flush requests, a threshold amount of data being accumulated, or an expiration of a predefined time period.

Embodiments of the inventive concept may include a system for intercepting input/outputs (I/Os) from an application using an I/O interceptor logic section. The system may include a mobile device including an application space, a kernel space, and one or more physical hardware devices. The system may include an input/output (I/O) interceptor logic section operable within the kernel space. The I/O interceptor logic section may include an I/O interface communicatively coupled with a storage stack and configured to intercept a plurality of write I/Os and a plurality of flush requests from an application within the application space, one or more temporary write holding buffers configured to receive the plurality of write I/Os from the I/O interface and to store the plurality of write I/Os, a re-order logic section communicatively coupled to the one or more temporary write holding buffers and configured to change an order of the plurality of write I/Os stored in the one or more temporary write holding buffers, and to combine the re-ordered plurality of write I/Os into a combined write I/O, and an intelligent flush control logic section configured to receive the plurality of flush requests from the I/O interface, to communicate write I/O completion of the plurality of write I/Os to the application without the plurality of write I/Os having been written to a non-volatile storage device from among the one or more physical hardware devices, and to cause the combined write I/O to be written to the non-volatile storage device responsive to at least one of a predefined Nth flush request from among the plurality flush requests, a threshold amount of data being accumulated, or an expiration of a predefined time period.

Certain of the inventive features may be best achieved by implementing them in a processor such as within ARM processor core. Other types of processors or application specific integrated circuits (ASICs) and/or firmware can implement the inventive principles disclosed herein. The inventive concepts may be implemented within processors and/or memory modules of a variety of mobile devices such as smart phones, tablets, notebook computers, or the like, or in a variety of stationary devices such as desktop computers, routers, or the like.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first power switch cell could be termed a second power switch cell, and, similarly, a second power switch cell could be termed a first power switch cell, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Figure 1:
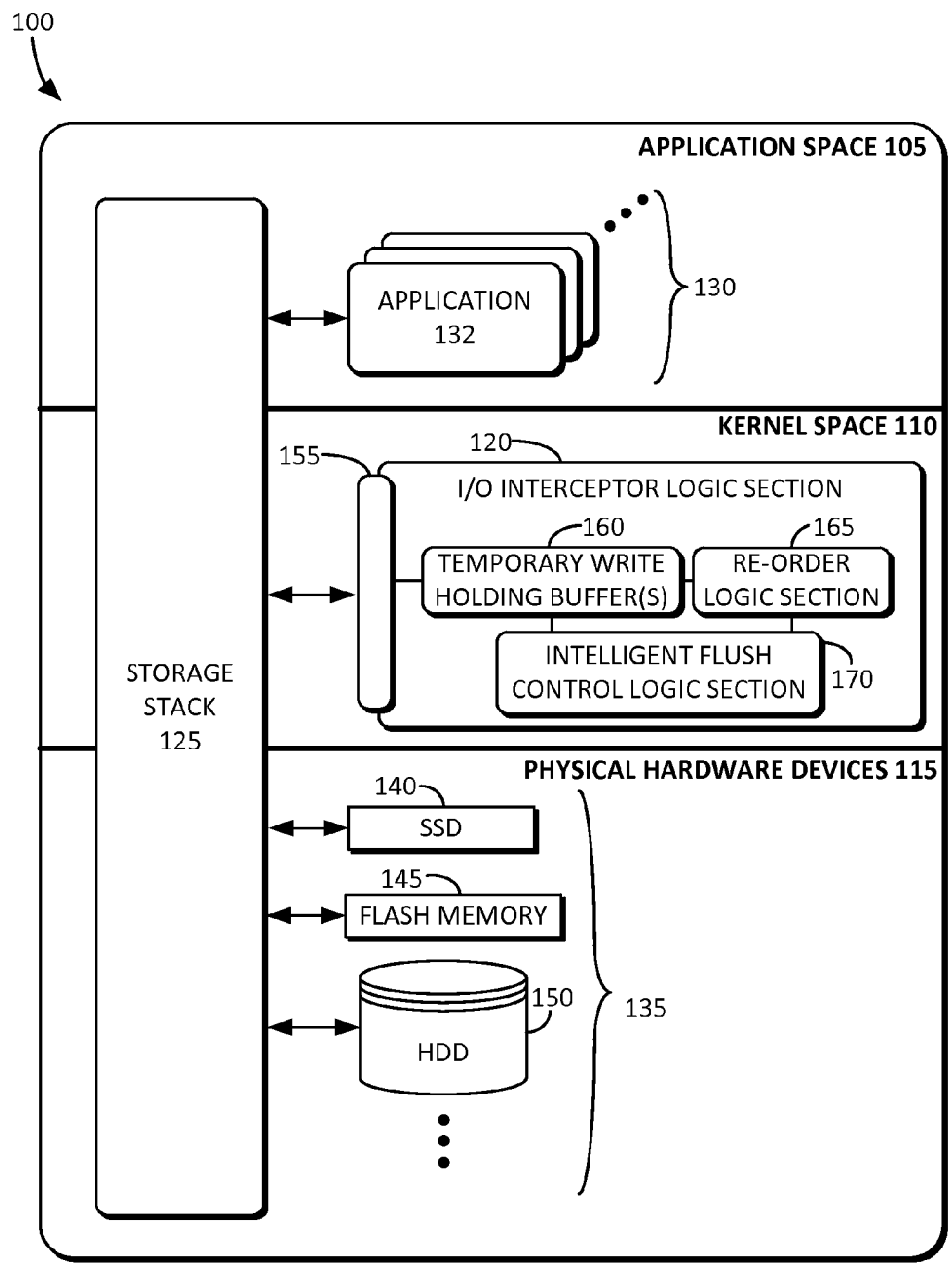
FIG. 1 is an example block diagram of a system stack including an application space, a kernel space, physical hardware devices, and an I/O interceptor logic section, in accordance with embodiments of the inventive concept.

FIG. 1 is an example block diagram of a system stack 100 including an application space 105, a kernel space 110, and physical hardware devices 115. In accordance with embodiments of the inventive concept, an input/output (I/O) interceptor logic section 120 can be operable within the kernel space 110. It will be understood that in an alternative embodiment, the I/O interceptor logic section 120 can be operable within the application space 105 or embedded within different sections or spaces of any suitable computing device. The system stack 100 can be included, for example, in a mobile device such as a smart phone or tablet, a camera, a laptop, a computer, or the like, as further described below.

As shown in FIG. 1, the system stack 100 can include a storage stack 125. The storage stack 125 can facilitate sending and receiving of input/outputs (I/Os) between one or more applications 130 of the application space 105, such as application 132, and one or more non-volatile storage devices 135 of the physical hardware devices 115. The one or more non-volatile storage devices 135 can include a solid state drive (SSD) 140, a flash memory 145, a hard disk drive 150, or the like.

The I/O interceptor logic section 120 can include an I/O interface 155, one or more temporary write holding buffers 160, a re-order logic section 165, and an intelligent flush control logic section 170. The I/O interface 155 can be communicatively coupled with the storage stack 125. The I/O interceptor logic section 120 can intercept all I/Os, including flush requests, from the application (e.g., 132). For example, the I/O interface 155 can intercept write I/Os, read I/Os, and flush requests from the application (e.g., 132). The one or more temporary write holding buffers 160 can receive the write I/Os from the I/O interface 155 and can store the write I/Os. The one or more temporary holding buffers 160 can be pre-allocated from free system memory.

The re-order logic section 165 can be communicatively coupled to the one or more temporary write holding buffers 160. The re-order logic section 165 can change an order of the write I/Os stored in the one or more temporary write holding buffers 160. The re-order logic section 165 can combine the re-ordered write I/Os into a combined write I/O, as further described below. The intelligent flush control logic section 170 can receive the flush requests from the I/O interface 155. The intelligent flush control logic section 170 can communicate write I/O completion of the write I/Os to the application (e.g., 132) without the write I/Os actually having been written to any of the one or more non-volatile storage devices 135. From the application's perspective, the write I/O has completed, while in reality, the write I/O has not been committed to non-volatile storage at this point in time. In other words, the intelligent flush control logic section 170 can communicate write I/O completion of the write I/Os to the application 132 before the write I/Os have actually been written to any of the one or more non-volatile storage devices 135. The intelligent flush control logic section 170 can cause the combined write I/O to be written to the one or more non-volatile storage devices 135 responsive to a predefined Nth flush request from among the flush requests, or other criteria, as also further described below.

Figure 2:
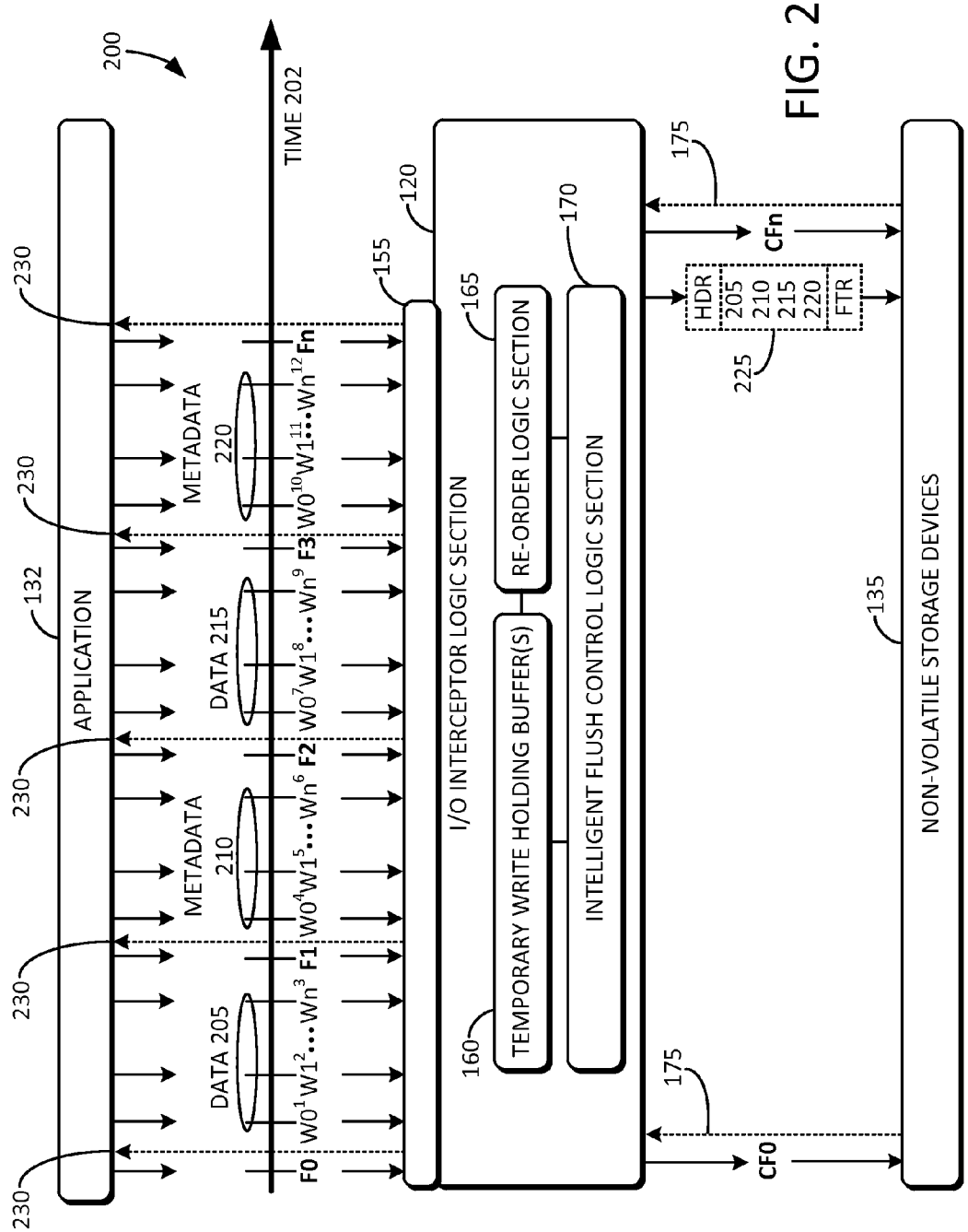
FIG. 2 is an example diagram of various components of the system stack of FIG. 1, including a series of events relative to time, in accordance with embodiments of the inventive concept.

FIG. 2 is an example diagram of various components of the system stack 100 of FIG. 1, including a series of events relative to time, as shown by timeline 202, in accordance with embodiments of the inventive concept.

The I/O interface 155 can intercept write I/Os including, for example, data write I/Os 205 (i.e., $W0^1$ through $Wn^3$), metadata write I/Os 210 (i.e., $W0^4$ through $Wn^6$), data write I/Os 215 (i.e., $W0^7$ through $Wn^9$), metadata write I/Os 220 (i.e., $W0^{10}$ through $Wn^{12}$), and flush requests (e.g., F0 through Fn) from the application (e.g., 132). The one or more temporary write holding buffers 160 can receive the write I/Os from the I/O interface 155 and can store the write I/Os. If a read I/O is received from the application while the data is resident in the one or more temporary write holding buffers 160, the I/O interceptor logic section 120 can serve the read I/O request from the copy that is resident in the one or more temporary write holding buffers 160, or alternatively, from a re-mapped memory location, as further described below. The re-order logic section 165 can change an order of the write I/Os stored in the one or more temporary write holding buffers 160, as further described below. The re-order logic section 165 can convert random write I/Os to sequential write I/Os. The re-order logic section 165 can combine the re-ordered write I/Os (e.g., 205, 210, 215, and 220) into a combined write I/O (e.g., 225).

The intelligent flush control logic section 170 can receive the flush requests (e.g., F0 through Fn) from the I/O interface 155. The intelligent flush control logic section 170 can communicate write I/O completion via corresponding completion messages (e.g., 230) of the write I/Os to the application (e.g., 132) without the write I/Os actually having been written to any of the one or more non-volatile storage devices 135. In other words, the intelligent flush control logic section 170 can substantially immediately reply to each flush request so that the application 132 can continue to send additional write I/Os without the need to wait for a corresponding flush request to actually be completed to one of the non-volatile storage devices 135, thereby significantly improving performance of the application 132. In other words, the intelligent flush control logic section 170 can communicate write I/O completion 230 of the write I/Os to the application 132 before the write I/Os have actually been written to any of the one or more non-volatile storage devices 135. Since the write I/O is stored in the one or more temporary write holding buffers 160, the intelligent flush control logic section 170 can cause at a later time the combined write I/O 225 to be actually written in a committed flush CFn to the one or more non-volatile storage devices 135. In other words, the intelligent flush control logic section 170 can implement a selective flush technique. The committed flush CFn can be a synchronous operation. Since the combined write I/O size is larger than the individual write I/Os, the storage performance is improved by reducing the overhead associated with each write I/O had they been sent to the non-volatile storage device independently. In addition, since the write I/Os can be completed from system memory, which has a significantly higher performance (i.e., high throughput and low latency) than the actual non-volatile storage devices, the performance of the application is significantly improved.

Moreover, since the committed flush CFn of the combined write I/O 225 occurs on or shortly following a flush boundary Fn (e.g., responsive to the predefined Nth flush Fn), the data will maintain its consistency. Even in the event of a sudden power loss, the data will remain consistent on the non-volatile storage devices 135, although there may be loss of data. Loss of data is acceptable to applications, because the applications can read the data that is existent on the non-volatile storage device, and recover or otherwise roll back its state based on the stored data. But data inconsistency is usually not tolerated by applications and can cause unpredictable behavior, or even cause the application to become inoperable. Embodiments of the inventive concept ensure data consistency by accumulating write IOs between committed flushes (e.g., CF0 and CFn), and then flushing the data in a combined write I/O to the non-volatile storage, as described herein.

The one or more non-volatile storage devices 135 can return a committed flush confirmation message (e.g., 175), which can be received by the I/O interceptor logic section 120, and used to confirm the completion of each committed flush transaction to the non-volatile storage, thereby providing synchronous committed flush operations. In other words, during a particular synchronous committed flush operation, other write IOs and non-committed flush requests that are not a part of the particular committed flush operation are accumulated and not permitted to be actually flushed to the non-volatile storage until a subsequent synchronous committed flush operation.

A sudden power loss can occur at any point in time, and the data will remain consistent. In other words, there will always be metadata paired with data on the one or more non-volatile storage devices 135. In other words, there can never be a situation in which metadata exists on the one or more non-volatile storage devices 135 without corresponding data. Consequently, in accordance with embodiments of the inventive concept, data consistency is maintained while significantly boosting performance of the application and storage stack.

In addition, a window of opportunity for re-ordering write IOs is expanded because what are typically committed flush requests can be transformed into non-committed flush requests. Typically, write IOs can only be re-ordered between flush boundaries (e.g., between F0 and F1). However, in accordance with embodiments of the inventive concept, typical flush requests are transformed into non-committed flush requests, and write IOs can be re-ordered across the non-committed flush boundaries (e.g., between F0 and Fn and across F1, F2, and F3) because the actual committed flushes (e.g., CF0 and CFn) occur on an expanded time scale. In other words, the number of write IOs is greater between two committed flushes (e.g., CF0 and CFn) than the number of write IOs between two non-committed flush requests (e.g., F0 and F1, F1 and F2, or F2 and F3, etc.), which occur more frequently and on a shorter time scale. By expanding the window of opportunity to re-order IOs, additional performance increases can be achieved because the IOs can be ordered in such a way that they are more efficient to write to the non-volatile storage devices, and are also more efficient to write in that they are grouped into a single combined (i.e., larger) write IO.

The intelligent flush control logic section 170 can cause the combined write I/O 225 to be written to the one or more non-volatile storage devices 135 responsive to a predefined Nth flush request (e.g., Fn) from among the flush requests. The predefined Nth flush request can correspond to N flush requests, where N is a predefined positive integer value. For example, N can be an integer of three or greater than three. By way of other examples, N can be an integer of 4, 5, 8, 10, 16, 20, 32, 64, 100, and so forth. N can be set to any suitable positive integer value. The number of flush requests N to accumulate before causing a committed flush CFn can be predefined (e.g., predetermined and set) prior to operation. Alternatively or in addition, the number of flush requests N to accumulate before causing a committed flush CFn can be a configurable setting, which can be modified by a user or system administrator.

Alternatively or in addition, the intelligent flush control logic section 170 can cause the committed flush CFn to write the combined write I/O 225 to the one or more non-volatile storage devices 135 responsive to a threshold amount of data being accumulated. In other words, when a threshold amount of data is reached, the intelligent flush control logic section 170 can cause the committed flush CFn. Alternatively or in addition, the intelligent flush control logic section 170 can cause the committed flush CFn to write the combined write I/O 225 to the one or more non-volatile storage devices 135 responsive to an expiration of a predefined period of time. The predefined period of time can be, for example, on the order of seconds, such as 5 seconds, 10 seconds, 30 seconds, 60 seconds, and so forth. This reduces the chances of data loss in the event of a sudden power loss, while boosting performance and maintaining data consistency. Alternatively or in addition, the intelligent flush control logic section 170 can cause the committed flush CFn to write the combined write I/O 225 to the one or more non-volatile storage devices 135 responsive to a first criteria that the threshold amount of data being accumulated, and then subsequently, responsive to a second criteria that the predefined Nth flush request is satisfied. In other words, the committed flush CFn can occur only when both criteria are satisfied.

The I/O interface 155 of the I/O interceptor logic section 120 can receive a first subset of data write I/Os (e.g., 205), a first flush request (e.g., F1), a first subset of metadata write I/Os (e.g., 210), a second flush request (e.g., F2), a second subset of data write I/Os (e.g., 215), a third flush request (e.g., F3), a second subset of metadata write I/Os (e.g., 220), and the predefined Nth flush request (e.g., Fn). The re-order logic section 165 can change the order of write I/Os within the first subset of the data write I/Os 205, the first subset of the metadata write I/Os 210, the second subset of the data write I/Os 215, and the second subset of the metadata write I/Os 220. In other words, the re-order logic section 165 can change the order of the individual write I/Os within each subset and/or change the order of the individual write I/Os across the various subsets. The re-order logic section 165 can combine the first subset of the data write I/Os 205, the first subset of the metadata write I/Os 210, the second subset of the data write I/Os 215, and the second subset of the metadata write I/Os 220 into the combined write I/O 225. The re-order logic section 165 can insert or otherwise attach a header HDR and footer FTR to the combined write I/O 225, as further described below.

Figure 3:
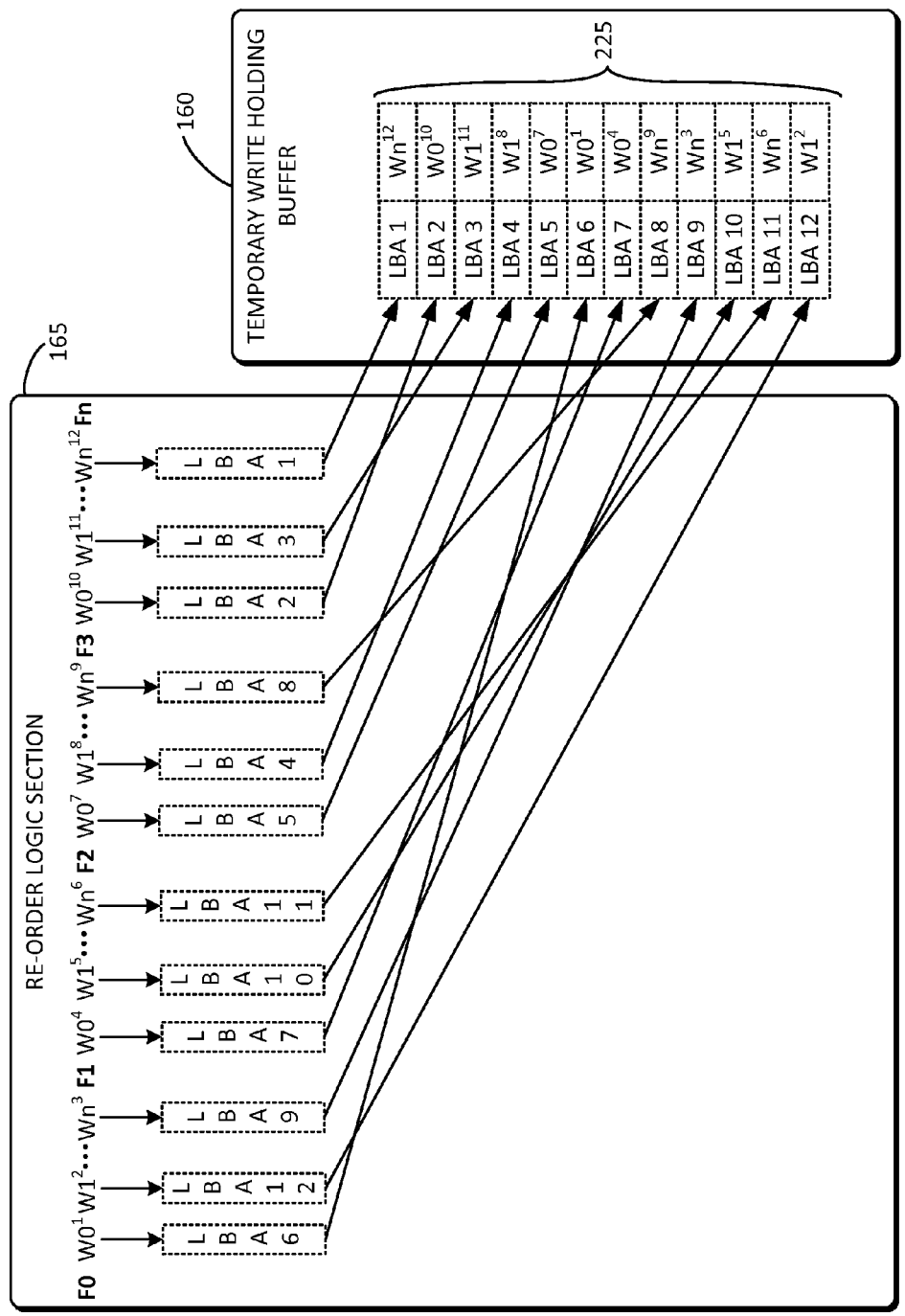
FIG. 3 is an example diagram of a re-order logic section of the I/O interceptor logic section and a temporary write holding buffer of the I/O interceptor logic section of FIG. 1 in accordance with embodiments of the inventive concept.

FIG. 3 is an example diagram of the re-order logic section 165 of the I/O interceptor logic section 120 (of FIGS. 1 and 2), and a temporary write holding buffer 160 of the I/O interceptor logic section 120 (of FIGS. 1 and 2) in accordance with embodiments of the inventive concept. As explained above, the re-order logic section 165 can change the order of the individual write I/Os within each subset and/or change the order of the individual write I/Os across the various subsets. In this example embodiment, write I/O $W0^1$ corresponds with logical block address (LBA) 6, write I/O $W1^2$ corresponds with LBA 12, write I/O $Wn^3$ corresponds with LBA 9, write I/O $W0^4$ corresponds with LBA 7, write I/O $W1^5$ corresponds with LBA 10, write I/O $Wn^6$ corresponds with LBA 11, write I/O $W0^7$ corresponds with LBA 5, write I/O $W1^8$ corresponds with LBA 4, write I/O $Wn^9$ corresponds with LBA 8, write I/O $W0^{10}$ corresponds with LBA 2, write I/O $W1^{11}$ corresponds with LBA 3, and write I/O $Wn^{12}$ corresponds with LBA 1. The various LBAs correspond with logical block addresses in the one or more non-volatile storage devices 135 to which the various corresponding write IOs are destined to be stored.

The re-order logic section 165 can change the order of the various write I/Os so that they can be arranged in a combined write I/O 225 in such a manner that each of LBAs (e.g., LBA 1, LBA 2, LBA 3, etc.) associated with a corresponding one of the write I/Os (e.g., $Wn^{12}$, $W0^{10}$, $W1^{11}$, and so forth) of the combined write I/O 225 is ordered in an ascending or descending arrangement. For example, the write I/Os can originally arrive in the following order having the following associated LBAs: $W0^1$/LBA 6, $W1^2$/LBA 12, $Wn^3$/LBA 9, $W0^4$/LBA 7, $W1^5$/LBA 10, $Wn^6$/LBA 11, $W0^7$/LBA 5, $W1^8$/LBA 4, $Wn^9$/LBA 8, $W0^{10}$/LBA 2, $W1^{11}$/LBA 3, and $Wn^{12}$/LBA 1. It will be understood that these LBA values are by way of example and not limitation as other LBAs not specifically described herein can fall within the various embodiments of the inventive concept described herein. The re-order logic section 165 can change the order of the individual write I/Os within the temporary write holding buffer 160 to have the following order: $Wn^{12}$/LBA 1, $W0^{10}$/LBA 2, $W1^{11}$/LBA 3, $W1^8$/LBA 4, $W0^7$/LBA 5, $W0^1$/LBA 6, $W0^4$/LBA 7, $Wn^9$/LBA 8, $Wn^3$/LBA 9, $W1^5$/LBA 10, $Wn^6$/LBA 11, and $W1^2$/LBA 12, as shown in FIG. 3. In this manner, the LBAs can be arranged in ascending or descending order so that the writing of the combined write I/O 225 to the one or more non-volatile storage devices 135 (of FIGS. 1 and 2) is more efficient.

Figure 4:
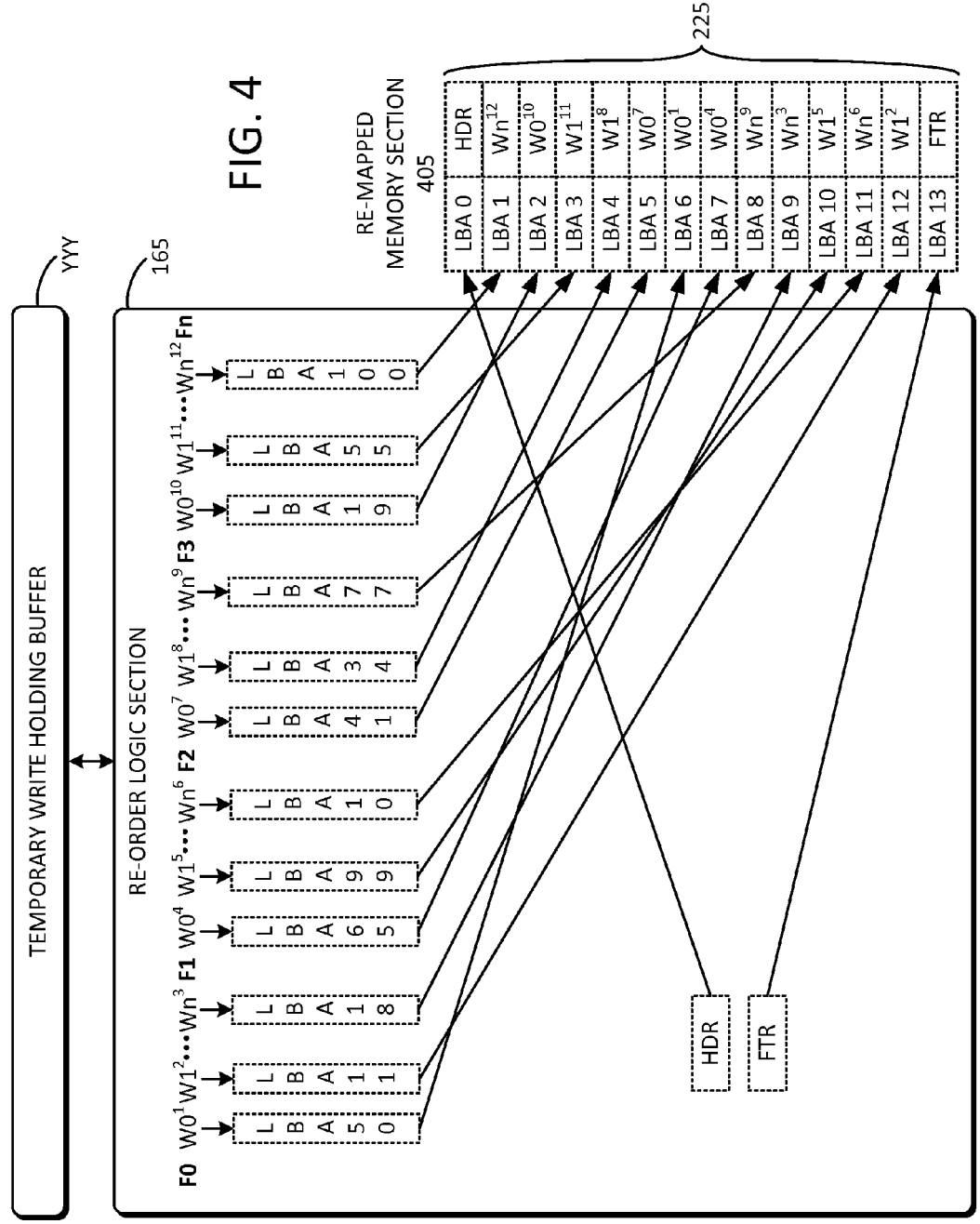
FIG. 4 an example diagram of a re-order logic section of the I/O interceptor logic section and a re-mapped memory section of the I/O interceptor logic section of FIG. 1 in accordance with embodiments of the inventive concept.

FIG. 4 an example diagram of the re-order logic section 165 of the I/O interceptor logic section 120 (of FIGS. 1 and 2), and a re-mapped memory section 405. The re-mapped memory section 405 can be allocated from system memory and/or within the I/O interceptor logic section 120 in accordance with embodiments of the inventive concept. It is common that the LBAs can not be simply re-ordered into an ascending, descending, and/or contiguous group because of the wide disparity of the LBAs. For example, the write I/Os can originally arrive in the following order having the following associated LBAs: $W0^1$/LBA 50, $W1^2$/LBA 11, $Wn^3$/LBA 18, $W0^4$/LBA 65, $W1^5$/LBA 99, $Wn^6$/LBA 10, $W0^7$/LBA 41, $W1^8$/LBA 34, $Wn^9$/LBA 77, $W0^{10}$/LBA 19, $W1^{11}$/LBA 55, and $Wn^{12}$/LBA 100. It will be understood that these LBA values are by way of example and not limitation as other LBAs not specifically described herein can fall within the various embodiments of the inventive concept described herein.

The re-order logic section 165 can change the order of the individual write I/Os by pre-pending a header HDR and appending a footer FTR, and re-mapping the individual write I/Os to the re-mapped memory section 405. In other words, the re-order logic section 165 can copy the individual write I/Os, a header HDR, and a footer FTR, to form the combined write I/O 225, such that each of a plurality of logical block addresses (LBAs) (e.g., 1, 2, 3, etc.) associated with a corresponding one of the plurality of write I/Os (e.g., $Wn^{12}$, $W0^{10}$, $W1^{11}$, etc.) of the combined write I/O 225 can be arranged in ascending or descending order, and such that each of the plurality of write I/Os (e.g., $Wn^{12}$, $W0^{10}$, $W1^{11}$, etc.) of the combined write I/O 225 are physically contiguous in the re-mapped memory section 405 to another of the plurality of write I/Os (e.g., $Wn^{12}$, $W0^{10}$, $W1^{11}$, etc.) of the combined write I/O 225. The re-order logic section 165 can convert random write I/Os to sequential write I/Os.

For example, the combined write I/O 225 within the re-mapped memory section 405 can have the individual write I/Os re-mapped and arranged in the following order: HDR/LBA 0, $Wn^{12}$/LBA 1, $W0^{10}$/LBA 2, $W1^{11}$/LBA 3, $W1^8$/LBA 4, $W0^7$/LBA 5, $W0^1$/LBA 6, $W0^4$/LBA 7, $Wn^9$/LBA 8, $Wn^3$/LBA 9, $W1^5$/LBA 10, $Wn^6$/LBA 11, $W1^2$/LBA 12, and FTR/LBA 13, as shown in FIG. 4. In this manner, the LBAs can be arranged in contiguous fashion so that the writing of the combined write I/O 225 to the one or more non-volatile storage devices 135 (of FIGS. 1 and 2) is more efficient.

In some embodiments, the re-mapped memory section 405 can be known only to the I/O interceptor logic section 120. The header HDR and/or footer FTR can include re-mapping translation information. Alternatively or in addition, the header HDR and/or footer FTR can include information that indicates that the combined write I/O 225 is valid. Any combined write I/O 225 having a header HDR but no footer FTR on the one or more non-volatile storage devices 135 can be considered invalid. Such a scenario can be caused by a sudden power loss during the committed flush operation CFn. In this scenario, the combined write I/O 225 can be determined to be invalid and can be discarded. When a valid combined write I/O 225 is later retrieved from the one or more non-volatile storage devices 135 to be read in a read I/O operation, the re-mapping translation information stored in the header HDR and/or the footer FTR can be used by the I/O interceptor logic section 120 to provide expected data and/or associated expected LBA information to the application 132.

The intelligent flush control logic section 170 can cause the physically contiguous combined write I/O 225 to be written to the one or more non-volatile storage devices 135 responsive to the predefined Nth flush request, or other criteria, as further described below.

Figure 5:
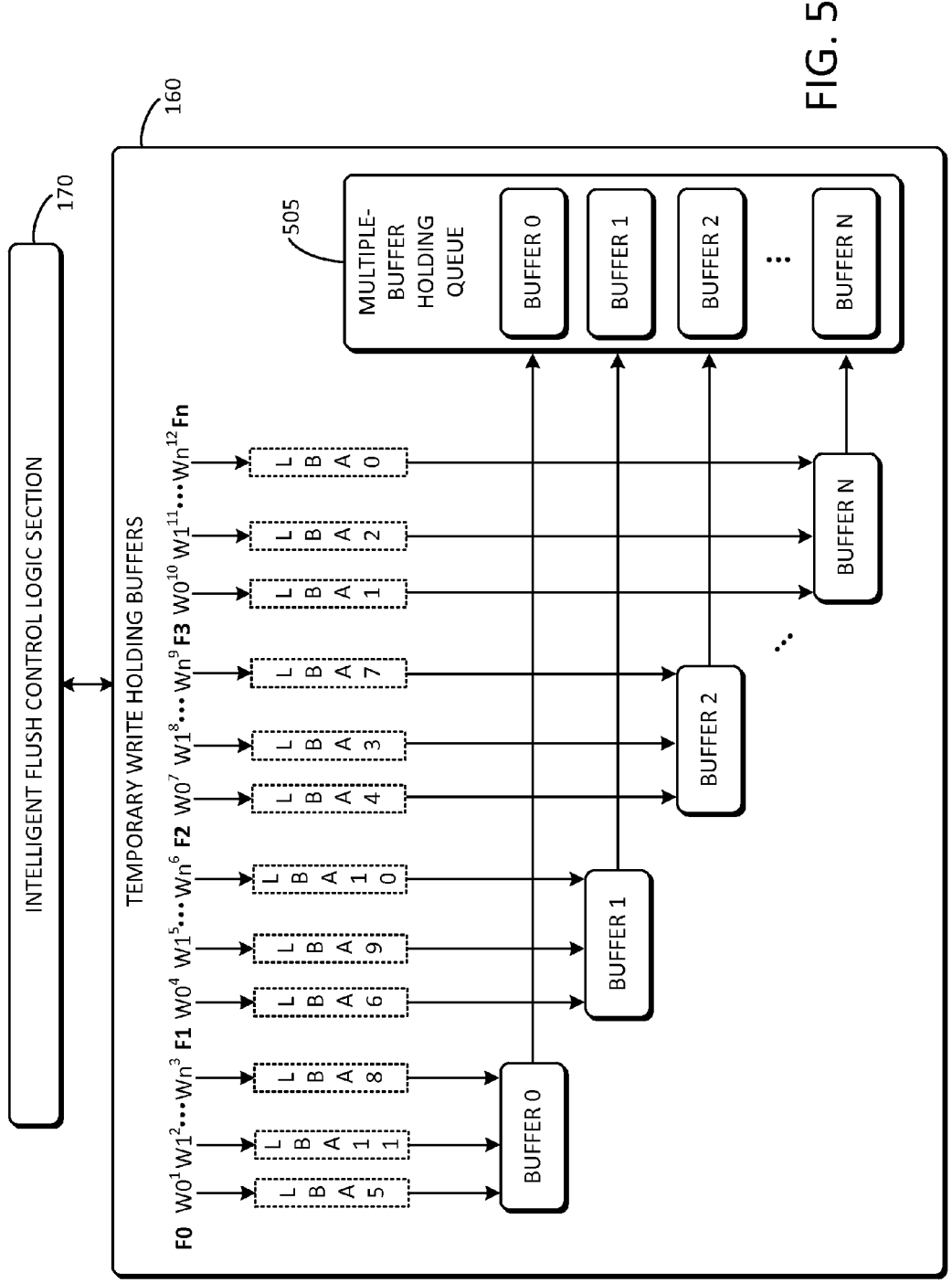
FIG. 5 is an example diagram of an intelligent flush control logic section of the I/O interceptor logic section and temporary write holding buffers of the I/O interceptor logic section of FIG. 1 in accordance with embodiments of the inventive concept.

FIG. 5 is an example diagram of the intelligent flush control logic section 170 of the I/O interceptor logic section 120 (of FIGS. 1 and 2), and temporary write holding buffers 160 of the I/O interceptor logic 120 section in accordance with embodiments of the inventive concept.

The re-order logic section 165 need not be included in the I/O interceptor logic 120. Rather, in this embodiment, the intelligent flush control logic section 170 can manage a plurality of temporary write holding buffers 160, such as Buffer 0, Buffer 1, Buffer 2, and Buffer N, as shown in FIG. 5. The temporary write holding buffers 160 can receive the write I/Os (e.g., $W0^1$, $W1^2$, $Wn^3$, etc.) from the I/O interface 155 (of FIGS. 1 and 2), and can store the write I/Os. A multiple-buffer holding queue 505 can hold the temporary write holding buffers.

The intelligent flush control logic section 170 can receive the plurality of flush requests (F0, F1, F2, etc.) from the I/O interface 155 (of FIGS. 1 and 2), and can communicate write I/O completion (e.g., 230 of FIG. 2) of the write I/Os (e.g., $W0^1$, $W1^2$, $Wn^3$, etc.) to the application (e.g., 132 of FIGS. 1 and 2) without the write I/Os having been written to the one or more non-volatile storage devices 135 (of FIGS. 1 and 2). In other words, the intelligent flush control logic section 170 can communicate write I/O completion of the write I/Os to the application 132 before the write I/Os have actually been written to any of the one or more non-volatile storage devices 135.

The intelligent flush control logic section 170 can cause the first subset of the data write I/Os (e.g., 205 of FIG. 2) to be stored in the first temporary write holding buffer Buffer 0, the first subset of the metadata write I/Os (e.g., 210 of FIG. 2) to be stored in the second temporary write holding buffer Buffer 1, the second subset of the data write I/Os (e.g., 215 of FIG. 2) to be stored in the third temporary write holding buffer Buffer 3, and the second subset of the metadata write I/Os (e.g., 220 of FIG. 2) to be stored in the fourth temporary write holding buffer Buffer N.

The intelligent flush control logic section 170 can cause the multiple-buffer holding queue 505 to empty the write I/Os from the temporary write holding buffers (e.g., Buffer 0, Buffer 1, Buffer 2, and Buffer N) to the one or more non-volatile storage devices 135 responsive to the predefined Nth flush request, and in the order received. In this embodiment, the re-ordering and re-mapping of the write I/Os is avoided, and no additional headers or footers are needed. On the other hand, the performance increase is not as pronounced as the embodiments described above because the LBAs are sent to the one or more non-volatile storage devices 135 in an essentially random fashion. In the event of a sudden power loss, data consistency is still maintained because the order in which the application intended to write the data is preserved.

Figure 6:
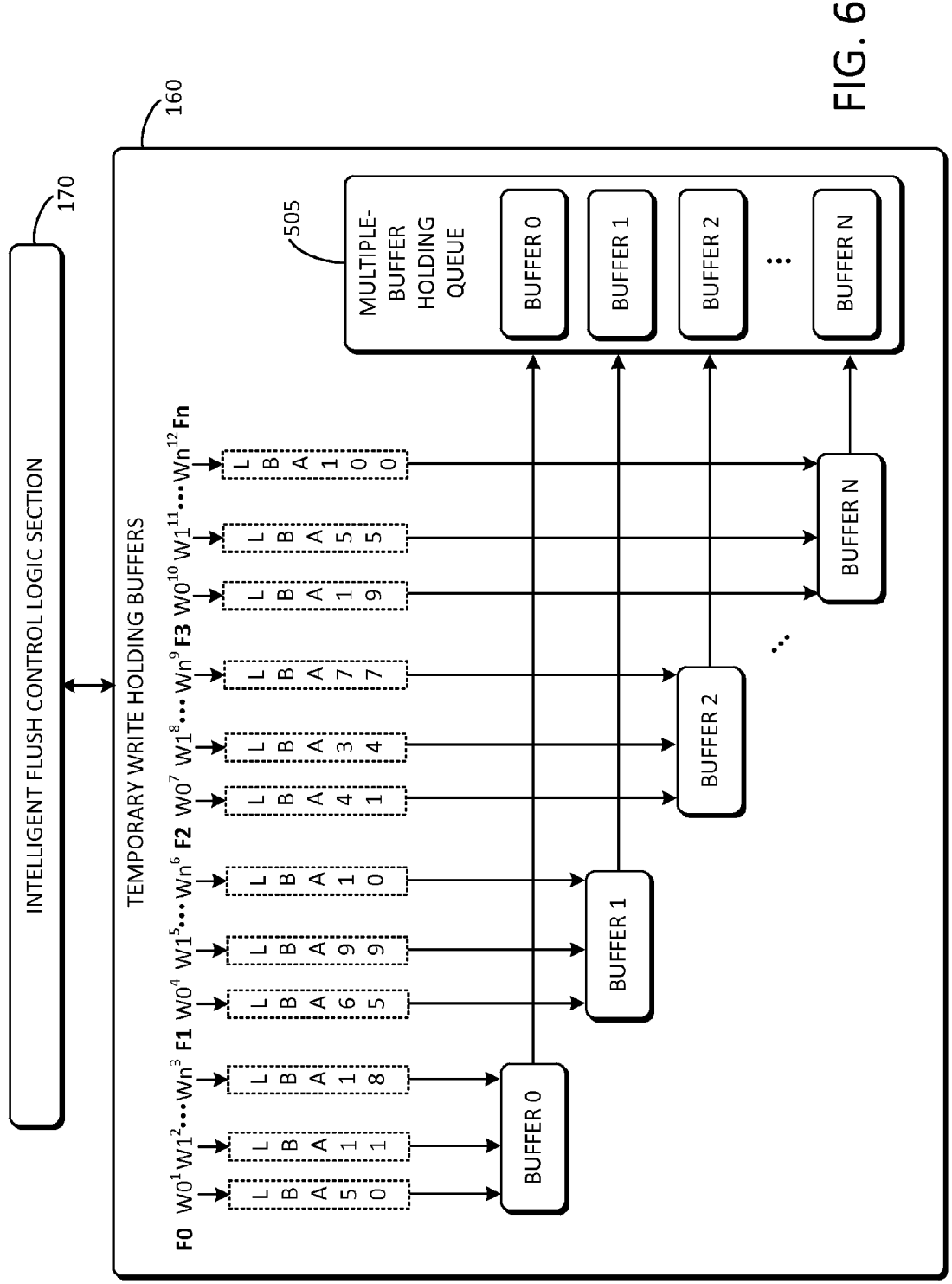
FIG. 6 is another example diagram of an intelligent flush control logic section of the I/O interceptor logic section and temporary write holding buffers of the I/O interceptor logic section of FIG. 1 in accordance with embodiments of the inventive concept.

FIG. 6 is another example diagram of an intelligent flush control logic section 170 of the I/O interceptor logic section 120 (of FIGS. 1 and 2), and temporary write holding buffers 160 of the I/O interceptor logic section in accordance with embodiments of the inventive concept. FIG. 6 is similar to that of FIG. 5 with the notable difference that the LBAs have a wide disparity. Nevertheless, the operation of this embodiment is the same or similar to that described with reference to FIG. 5 above, and therefore, a detailed description is not repeated. It will be understood, however, that the embodiment shown in FIG. 6 having a wide disparity in the LBA values falls within the inventive concept, and can be implemented in a fashion that is the same as or similar to that described with reference to FIG. 5 above.

FIGS. 7-12 are schematic diagrams of a various devices in which the I/O interceptor logic section 120 of FIG. 1 can be embedded, in accordance with embodiments of the inventive concept.

Figure 7:
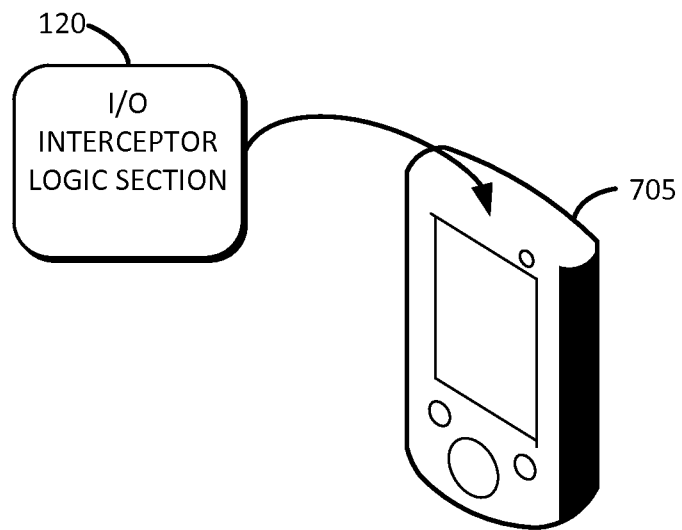
FIGS. 7-12 are schematic diagrams of a various devices in which the I/O interceptor logic section of FIG. 1 can be embedded, in accordance with embodiments of the inventive concept.
Figure 8:
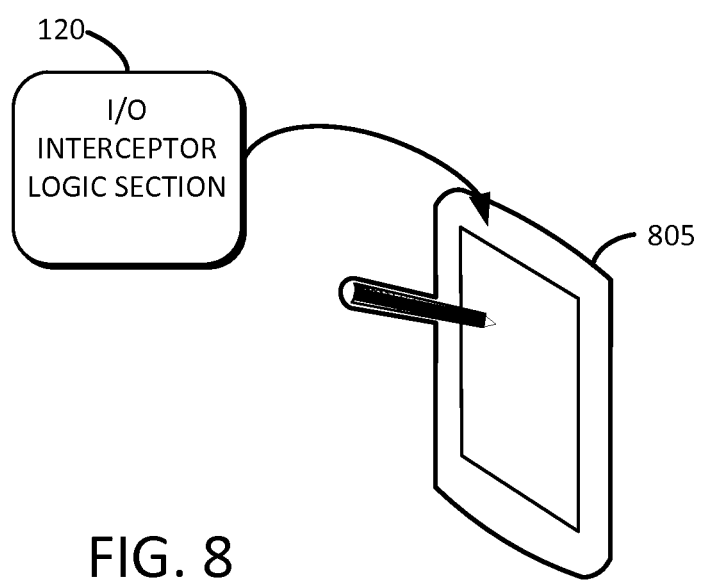
Figure 9:
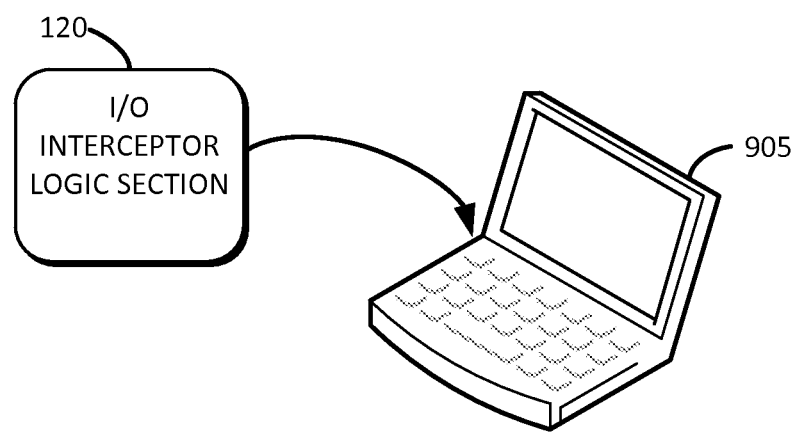
Figure 10:
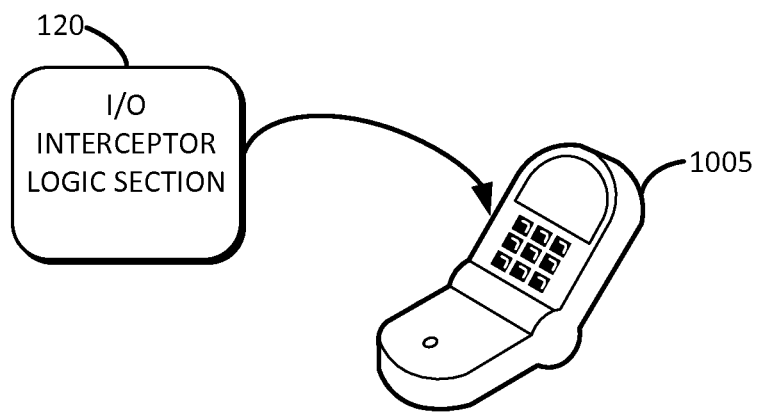
Figure 11:
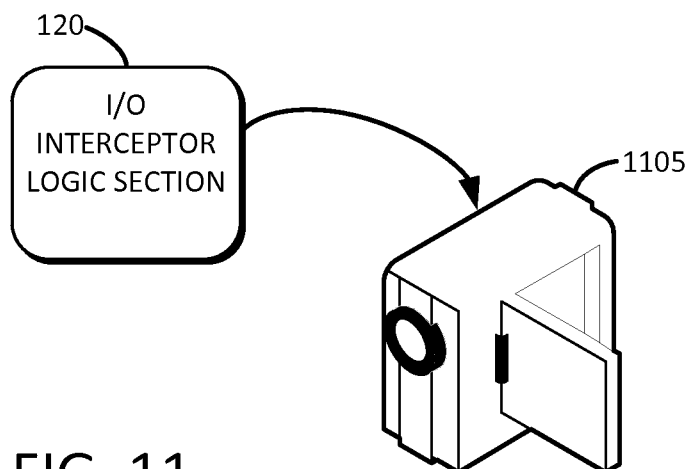
Figure 12:
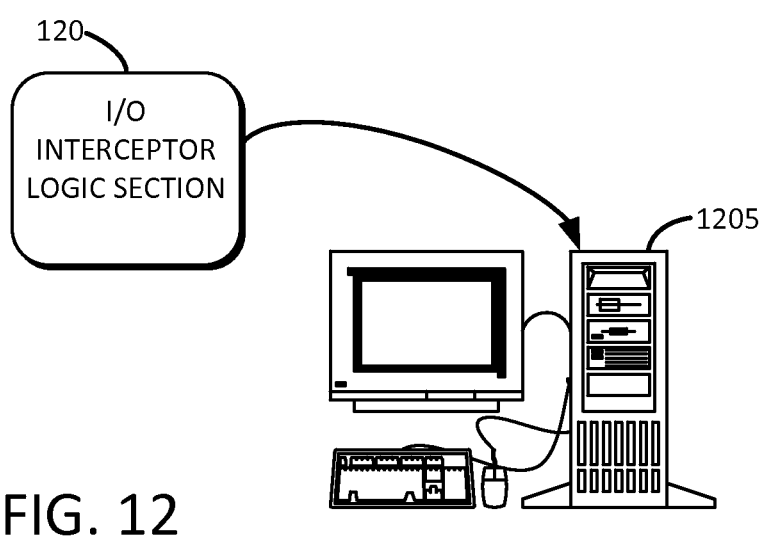

For example, as can be seen in FIG. 7, smart phone 705 can include the I/O interceptor logic section 120, as described in detail above. Similarly, the tablet 805 shown in FIG. 8, the notebook computer 905 shown in FIG. 9, the mobile phone 1005 shown in FIG. 10, the camera 1105 shown in FIG. 11, and the desktop computer 1205 shown in FIG. 12 can include the I/O interceptor logic section 120, as described in detail above. It will be understood that any suitable device that uses non-volatile storage can include or otherwise operate with the I/O interceptor logic section 120, as described in detail above.

Figure 13:
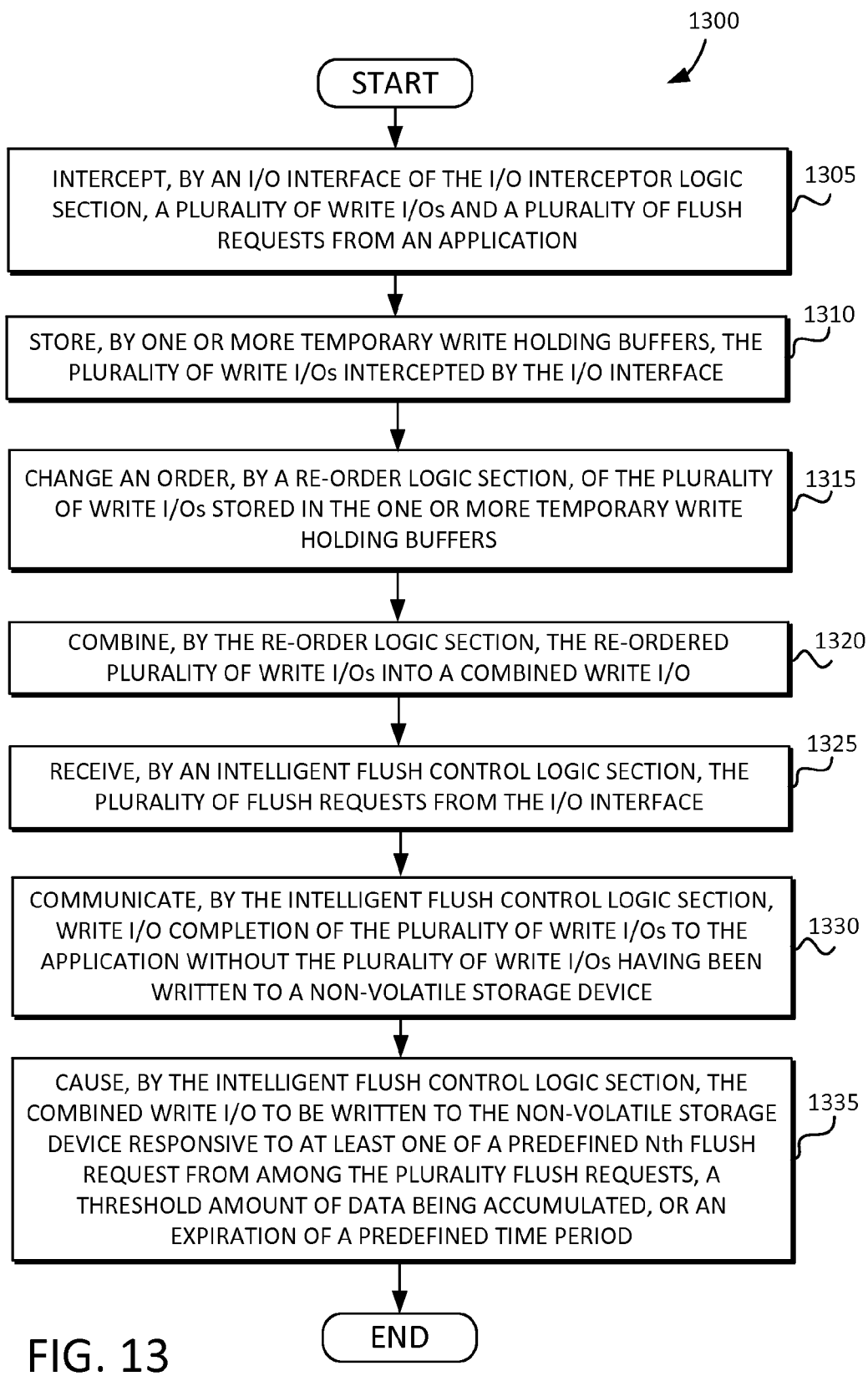
FIG. 13 is a flow diagram illustrating a technique for intercepting I/Os from an application using an I/O interceptor logic section in accordance with embodiments of the inventive concept.

FIG. 13 is a flow diagram 1300 illustrating a technique for intercepting I/Os from an application using an I/O interceptor logic section (e.g., 120 of FIG. 1) in accordance with embodiments of the inventive concept. The technique begins at 1305 where a plurality of write I/Os and a plurality of flush requests can be intercepted, by an I/O interface of the I/O interceptor logic section, from an application. At 1310, the plurality of write I/Os received by the I/O interface can be stored, by one or more temporary write holding buffers. At 1315, re-order logic section can change an order of the plurality of write I/Os stored in the one or more temporary write holding buffers. At 1320, the re-order logic section can combine the re-ordered plurality of write I/Os into a combined write I/O.

At 1325, an intelligent flush control logic section can receive the plurality of flush requests from the I/O interface. At 1330, the intelligent flush control logic section can communicate write I/O completion of the plurality of write I/Os to the application without the plurality of write I/Os having been written to a non-volatile storage device. In other words, the intelligent flush control logic section can communicate write I/O completion of the write I/Os to the application before the write I/Os have actually been written to any of the one or more non-volatile storage devices 135. At 1335, the intelligent flush control logic section can cause the combined write I/O to be written to the non-volatile storage device responsive to at least one of a predefined Nth flush request from among the plurality flush requests, a threshold amount of data being accumulated, or an expiration of a predefined time period.

Figure 14:
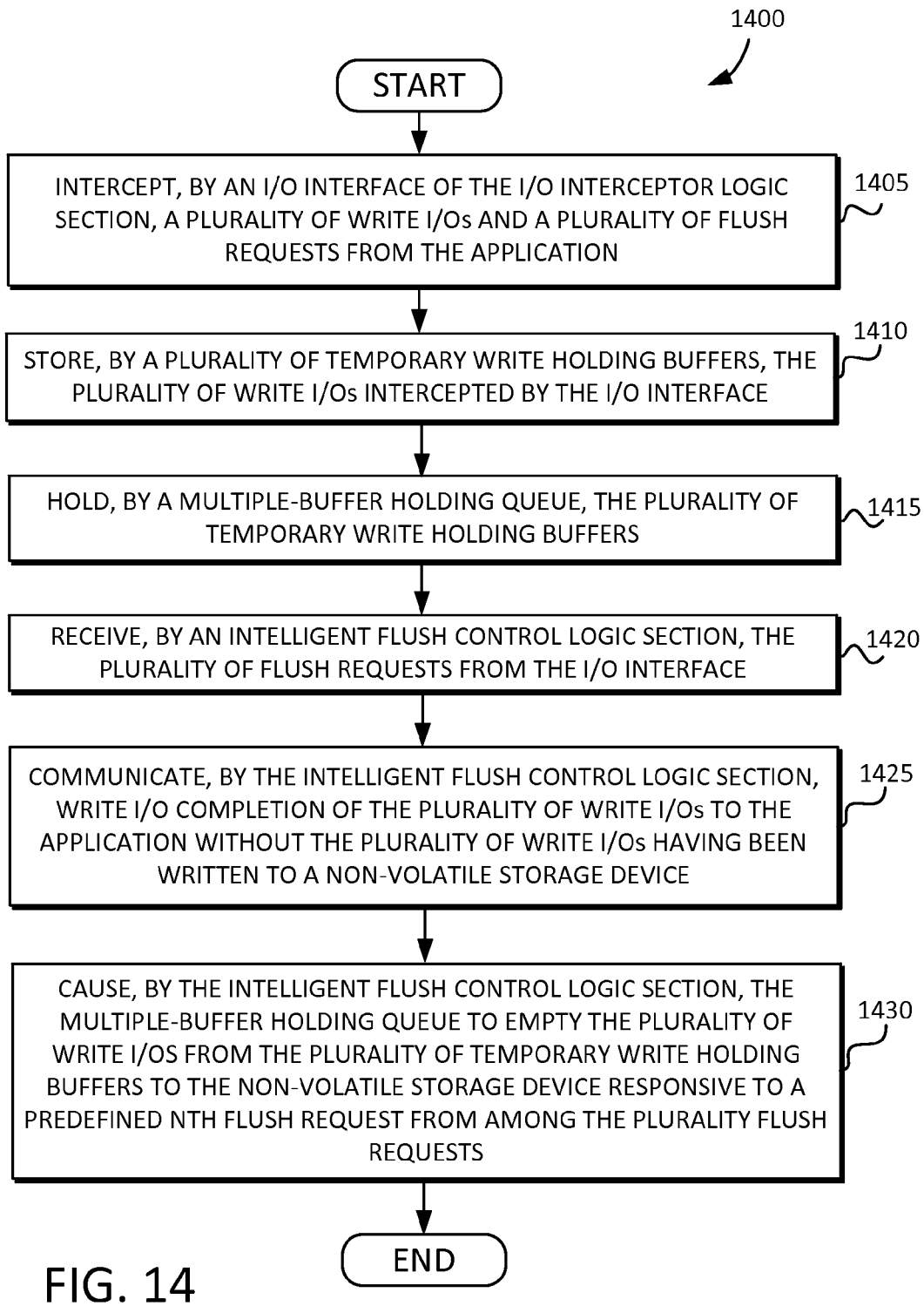
FIG. 14 is a flow diagram illustrating another technique for intercepting I/Os from an application using an I/O interceptor logic section in accordance with embodiments of the inventive concept.

FIG. 14 is a flow diagram 1400 illustrating another technique for intercepting I/Os from an application using an I/O interceptor logic section (e.g., 120 of FIG. 1) in accordance with embodiments of the inventive concept. The technique begins at 1405 where a plurality of write I/Os and a plurality of flush requests can be received, by an I/O interface of the I/O interceptor logic section, from an application. At 1410, the plurality of write I/Os intercepted by the I/O interface can be stored, by a plurality of temporary write holding buffers. At 1415, the multiple-buffer holding queue can hold the plurality of temporary write holding buffers.

At 1420, the intelligent flush control logic section can receive the plurality of flush requests from the I/O interface. At 1425, the intelligent flush control logic section can communicate write I/O completion of the plurality of write I/Os to the application without the plurality of write I/Os having been written to a non-volatile storage device. In other words, the intelligent flush control logic section can communicate write I/O completion of the write I/Os to the application before the write I/Os have actually been written to any of the one or more non-volatile storage devices 135. At 1430, the intelligent flush control logic section can cause the multiple-buffer holding queue to empty the plurality of write I/Os from the plurality of temporary write holding buffers to the non-volatile storage device responsive to at least one of a predefined Nth flush request from among the plurality flush requests, a threshold amount of data being accumulated, or an expiration of a predefined time period.

Figure 15:
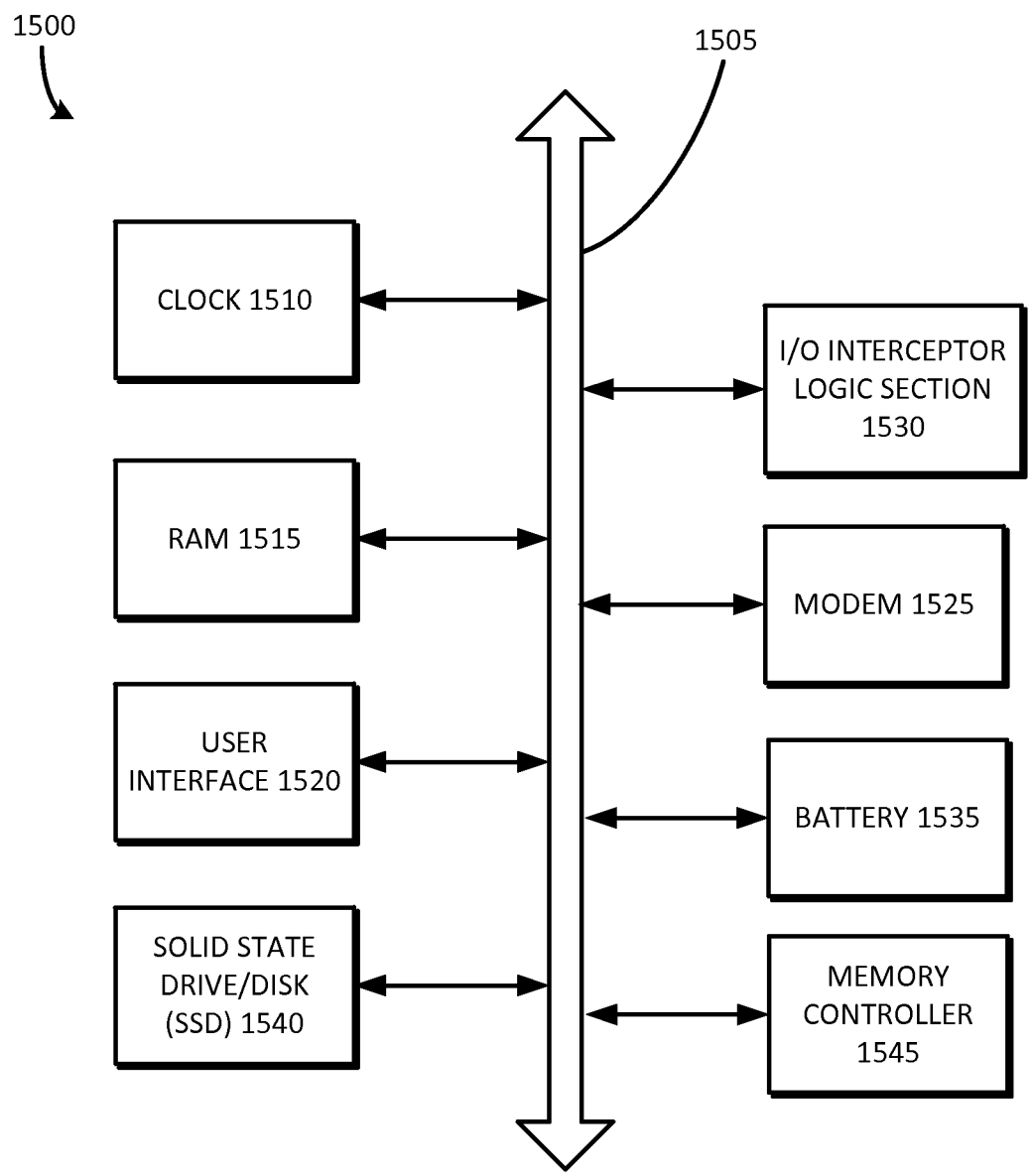
FIG. 15 is a block diagram of a computing system including an I/O interceptor logic section according to embodiments of the inventive concept as disclosed herein.

FIG. 15 is a block diagram of a computing system 1500 including an I/O interceptor logic section 1530 according to embodiments of the inventive concept as disclosed herein. Referring to FIG. 15, the computing system 1500 may also include a clock 1510, a random access memory (RAM) 1515, a user interface 1520, a modem 1525 such as a baseband chipset, a solid state drive/disk (SSD) 1540, a memory controller 1545, and/or a battery 1535, any or all of which may be electrically coupled to a system bus 1505. The I/O interceptor logic section 1530 can correspond to 120 described in detail above, and as set forth herein, and may also be electrically coupled to the system bus 1505.

If the computing system 1500 is a mobile device, the battery 1040 can power the computing system 1000, and battery drain can be reduced by implementation of the embodiments of the inventive concept described herein due more efficient writing of data to storage. Although not shown in FIG. 15, the computing system 1500 may further include an application chipset, a camera image processor (CIS), a mobile DRAM, and the like.

In example embodiments, the computing system 1500 may be used as computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including harddrives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. An input/output (I/O) interceptor logic section, comprising:
   an I/O interface communicatively coupled with a storage stack and configured to intercept a plurality of write I/Os and a plurality of flush requests from an application;
   one or more temporary write holding buffers configured to receive the plurality of write I/Os from the I/O interface and to store the plurality of write I/Os;
   a re-order logic section communicatively coupled to the one or more temporary write holding buffers and configured to change an order of the plurality of write I/Os stored in the one or more temporary write holding buffers, and to combine the re-ordered plurality of write I/Os into a combined write I/O; and
   an intelligent flush control logic section configured to receive the plurality of flush requests from the I/O interface, to communicate write I/O completion of the plurality of write I/Os to the application without the plurality of write I/Os having been written to a non-volatile storage device, and to cause the combined write I/O to be written to the non-volatile storage device responsive to a predefined Nth flush request from among the plurality flush requests.

2. The I/O interceptor logic section of claim 1, wherein the predefined Nth flush request corresponds to N flush requests from among the plurality of flush requests, wherein N is a predefined positive integer value.

3. The I/O interceptor logic section of claim 1, wherein the predefined Nth flush request corresponds to N flush requests from among the plurality of flush requests, wherein N is an integer of three or greater than three.

4. The I/O interceptor logic section of claim 1, wherein the I/O interface is configured to intercept a first subset of data write I/Os from among the plurality of write I/Os, a first flush request from among the plurality of flush requests, a first subset of metadata write I/Os from among the plurality of write I/Os, a second flush request from among the plurality of flush requests, a second subset of data write I/Os from among the plurality of write I/Os, a third flush request from among the plurality of flush requests, a second subset of metadata write I/Os from among the plurality of write I/Os, and the predefined Nth flush request from among the plurality flush requests.

5. The I/O interceptor logic section of claim 4, wherein the re-order logic section is configured to:
   change the order of the plurality of write I/Os included in the first subset of the data write I/Os, the first subset of the metadata write I/Os, the second subset of the data write I/Os, and the second subset of the metadata write I/Os so that logical block addresses (LBAs) associated with the plurality of write I/Os are arranged in ascending or descending order; and
   combine the re-ordered plurality of write I/Os included in the first subset of the data write I/Os, the first subset of the metadata write I/Os, the second subset of the data write I/Os, and the second subset of the metadata write I/Os into the combined write I/O.

6. The I/O interceptor logic section of claim 4, wherein the re-order logic section is configured to:
   copy the plurality of write I/Os, a header, and a footer, to a re-mapped memory section to form the combined write I/O, such that each of a plurality of logical block addresses (LBAs) associated with a corresponding one of the plurality of write I/Os of the combined write I/O are arranged in ascending or descending order, and such that each of the plurality of write I/Os of the combined write I/O are physically contiguous in the re-mapped memory section to another of the plurality of write I/Os of the combined write I/O.

7. The I/O interceptor logic section of claim 6, wherein the intelligent flush control logic section is configured to cause the physically contiguous combined write I/O to be written to the non-volatile storage device responsive to the predefined Nth flush request from among the plurality flush requests.

8. The I/O interceptor logic section of claim 1, wherein the re-order logic section is configured to convert random write I/Os from among the plurality of write I/Os to sequential write I/Os.

9. An input/output (I/O) interceptor logic section, comprising:
    an I/O interface communicatively coupled with a storage stack and configured to intercept a plurality of write I/Os and a plurality of flush requests from an application;
    a plurality of temporary write holding buffers configured to receive the plurality of write I/Os from the I/O interface and to store the plurality of write I/Os;
    a multiple-buffer holding queue configured to hold the plurality of temporary write holding buffers; and
    an intelligent flush control logic section configured to receive the plurality of flush requests from the I/O interface, to communicate write I/O completion of the plurality of write I/Os to the application without the plurality of write I/Os having been written to a non-volatile storage device, and to cause the multiple-buffer holding queue to empty the plurality of write I/Os from the plurality of temporary write holding buffers to the non-volatile storage device responsive to a predefined Nth flush request from among the plurality flush requests.

10. The I/O interceptor logic section of claim 9, wherein the predefined Nth flush request corresponds to N flush requests from among the plurality of flush requests, wherein N is a predefined positive integer value.

11. The I/O interceptor logic section of claim 9, wherein the predefined Nth flush request corresponds to N flush requests from among the plurality of flush requests, wherein N is an integer of three or greater than three.

12. The I/O interceptor logic section of claim 9, wherein the I/O interface is configured to intercept a first subset of data write I/Os from among the plurality of write I/Os, a first flush request from among the plurality of flush requests, a first subset of metadata write I/Os from among the plurality of write I/Os, a second flush request from among the plurality of flush requests, a second subset of data write I/Os from among the plurality of write I/Os, a third flush request from among the plurality of flush requests, a second subset of metadata write I/Os from among the plurality of write I/Os, and the predefined Nth flush request from among the plurality flush requests.

13. The I/O interceptor logic section of claim 12, further comprising a first temporary write holding buffer from among the plurality of temporary write holding buffers, a second temporary write holding buffer from among the plurality of temporary write holding buffers, a third temporary write holding buffer from among the plurality of temporary write holding buffers, and a fourth temporary write holding buffer from among the plurality of temporary write holding buffers,
    wherein the intelligent flush control logic section is configured to cause the first subset of the data write I/Os to be stored in the first temporary write holding buffer, the first subset of the metadata write I/Os to be stored in the second temporary write holding buffer, the second subset of the data write I/Os to be stored in the third temporary write holding buffer, and the second subset of the metadata write I/Os to be stored in the fourth temporary write holding buffer.

14. A computer-implemented method for intercepting input/outputs (I/Os) from an application using an I/O interceptor logic section, the method comprising:
    intercepting, by an I/O interface of the I/O interceptor logic section, a plurality of write I/Os and a plurality of flush requests from the application;
    storing, by one or more temporary write holding buffers, the plurality of write I/Os intercepted by the I/O interface;
    changing an order, by a re-order logic section, of the plurality of write I/Os stored in the one or more temporary write holding buffers;
    combining, by the re-order logic section, the re-ordered plurality of write I/Os into a combined write I/O;
    receiving, by an intelligent flush control logic section, the plurality of flush requests from the I/O interface;
    communicating, by the intelligent flush control logic section, write I/O completion of the plurality of write I/Os to the application without the plurality of write I/Os having been written to a non-volatile storage device; and
    causing, by the intelligent flush control logic section, the combined write I/O to be written to the non-volatile storage device responsive to a predefined Nth flush request from among the plurality flush requests.

15. The computer-implemented method of claim 14, wherein the predefined Nth flush request corresponds to N flush requests from among the plurality of flush requests, wherein N is a predefined positive integer value.

16. The computer-implemented method of claim 14, wherein the predefined Nth flush request corresponds to N flush requests from among the plurality of flush requests, wherein N is an integer of three or greater than three.

17. The computer-implemented method of claim 14, further comprising:
    intercepting, by the I/O interface, a first subset of data write I/Os from among the plurality of write I/Os, a first flush request from among the plurality of flush requests, a first subset of metadata write I/Os from among the plurality of write I/Os, a second flush request from among the plurality of flush requests, a second subset of data write I/Os from among the plurality of write I/Os, a third flush request from among the plurality of flush requests, a second subset of metadata write I/Os from among the plurality of write I/Os, and the predefined Nth flush request from among the plurality flush requests.

18. The computer-implemented method of claim 17, further comprising:
    changing, by the re-order logic section, the order of the plurality of write I/Os included in the first subset of the data write I/Os, the first subset of the metadata write I/Os, the second subset of the data write I/Os, and the second subset of the metadata write I/Os; and combining, by the re-order logic section, the re-ordered plurality of write I/Os included in the first subset of the data write I/Os, the first subset of the metadata write I/Os, the second subset of the data write I/Os, and the second subset of the metadata write I/Os into the combined write I/O.

19. The computer-implemented method of claim 17, further comprising:
copying, by the re-order logic section, the plurality of write I/Os, a header, and a footer, to form the combined write I/O, such that each of a plurality of logical block addresses (LBAs) associated with a corresponding one of the plurality of write I/Os of the combined write I/O are arranged in ascending or descending order, and such that each of the plurality of write I/Os of the combined write I/O are physically contiguous in the re-mapped memory section to another of the plurality of write I/Os of the combined write I/O.

20. The computer-implemented method of claim 19, further comprising:
causing, by the intelligent flush control logic section, the physically contiguous combined write I/O to be written to the non-volatile storage device responsive to the predefined Nth flush request from among the plurality flush requests.

* * * * *